United States Patent
Bubb et al.

(10) Patent No.: US 9,727,756 B2
(45) Date of Patent: *Aug. 8, 2017

(54) ACCESS AND PROTECTION OF I2C INTERFACES

(71) Applicant: International Business Machines Corporation, Armonk, NY (US)

(72) Inventors: Clinton E. Bubb, Pleasant Valley, NY (US); Andrew R. Ranck, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/254,064

(22) Filed: Sep. 1, 2016

(65) Prior Publication Data

US 2016/0364361 A1 Dec. 15, 2016

Related U.S. Application Data

(63) Continuation of application No. 15/090,961, filed on Apr. 5, 2016, now Pat. No. 9,524,403, which is a continuation of application No. 14/568,524, filed on Dec. 12, 2014.

(51) Int. Cl.
| | |
|---|---|
| *G06F 13/00* | (2006.01) |
| *G06F 21/85* | (2013.01) |
| *G06F 13/42* | (2006.01) |
| *G06F 13/364* | (2006.01) |
| *G06F 13/40* | (2006.01) |
| *G06F 12/14* | (2006.01) |

(52) U.S. Cl.
CPC .......... *G06F 21/85* (2013.01); *G06F 12/1441* (2013.01); *G06F 13/364* (2013.01); *G06F 13/404* (2013.01); *G06F 13/4282* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 8,626,973 B2 * | 1/2014 | Austen | ............... | G06F 13/4291 710/110 |
| 9,213,866 B1 | 12/2015 | Ahmad et al. | | |
| 2002/0194291 A1 * | 12/2002 | Najam | ............... | H04L 49/103 709/213 |
| 2004/0133777 A1 * | 7/2004 | Kiriansky | ............. | G06F 21/554 713/166 |

(Continued)

*Primary Examiner* — Michael Sun
(74) *Attorney, Agent, or Firm* — Cantor Colburn LLP

(57) ABSTRACT

A method, computer program product, and system to implement access control from a master device to a slave device over an inter-integrated circuit (I2C) interface are described. The method includes generating, using a processor, a control block defining the access control to the slave device over the I2C interface. The generating the control block is performed by the trusted code layer and the generating the control block is prohibited by the user-modifiable code layer. The method also includes controlling a command over the I2C interface to the slave device based on a generated command from the trusted code layer and the user-modifiable code layer in accordance with the control block.

1 Claim, 8 Drawing Sheets

(56) References Cited

U.S. PATENT DOCUMENTS

2012/0255012 A1* 10/2012 Sallam .................... G06F 21/52
    726/24
2014/0149616 A1   5/2014 Chiang et al.

* cited by examiner

← 307

| Bits | Definition |
|---|---|
| "000" | Not Allowed |
| "001" | Allowed when in Debug/Lab Mode |
| "010" | Allowed |
| "011" | Allowed subject to the Basic Address Protection Block |
| "100" | Allowed based on the Advanced Address Protection Block. The address must be inclusively between the limits in the first block or inclusively between the limits in the second block (if defined) |
| "101" | Allowed based on the Advanced Address Protection Block. The address must be inclusively between the limits in the first block or inclusively outside the limits in the second block (if defined) |
| "110" | Allowed based on the Advanced Address Protection Block. The address must be inclusively outside the limits in the first block or inclusively between the limits in the second block (if defined) |
| "111" | Allowed based on the Advanced Address Protection Block. The address must be inclusively outside the limits in the first block or inclusively outside the limits in the second block (if defined) |

FIG. 4

ACCESS AND PROTECTION OF I2C INTERFACES

DOMESTIC BENEFIT/NATIONAL STAGE INFORMATION

This application is a continuation of U.S. application Ser. No. 15/090,961 filed Apr. 5, 2016, which is a continuation of U.S. application Ser. No. 14/568,524 filed Dec. 12, 2014, the disclosures of which are incorporated by reference herein in their entirety.

BACKGROUND

The present disclosure relates generally to inter-integrated circuit (I2C) interfaces, and more specifically, to access and protection of I2C interfaces.

An I2C interface is a standard interface characterized by bidirectional serial communication over two wires between any master device and any slave device. The I2C interface is also known as $I^2C$ or IIC. Devices (slave devices) designed with an I2C interface may only be accessed via the interface, and these devices may be referred to as I2C devices. The interface facilitates complete access (read and write) to the I2C device by any master device that broadcasts an I2C device address over the I2C interface.

SUMMARY

According to an embodiment, a computer program product for implementing access control to a slave device over an inter-integrated circuit (I2C) interface from a master device includes a computer readable storage medium having program instructions embodied therewith, the program instructions readable by a processing circuit to cause the processing circuit to perform a method. The method includes generating a control block that defines the access control to the slave device over the I2C interface, the generating the control block being performed by a trusted code layer of the master device and the generating the control block being prohibited by a user-modifiable code layer of the master device; and controlling a command over the I2C interface to the slave device based on a generated command from the trusted code layer or the user-modifiable code layer in accordance with the control block.

According to another embodiment, a method of implementing access control to a slave device over an inter-integrated circuit (I2C) interface from a master device including a trusted code layer and a user-modifiable code layer includes generating, using a processor, a control block defining the access control to the slave device over the I2C interface, the generating the control block being performed by the trusted code layer and the generating the control block being prohibited by the user-modifiable code layer; and controlling a command over the I2C interface to the slave device based on a generated command from the trusted code layer and the user-modifiable code layer in accordance with the control block.

According to yet another embodiment, a system configured to implement access control from a master device to a slave device over an inter-integrated circuit (I2C) interface includes a trusted code layer of the master device, the trusted code layer configured to generate or modify a control block defining the access control to the slave device over the I2C interface; a user-modifiable code layer of the master device, the user-modifiable code layer being configured to be prohibited from generating or modifying the control block; and a memory device configured to store the control block, wherein the master device controls a command over the I2C interface to the slave device based on a generated command from the trusted code layer and the user-modifiable code layer in accordance with the control block.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 4 is an example of optional definitions for a read field of a level of code according to an embodiment;

DETAILED DESCRIPTION

As noted above, an I2C device (slave device accessible via an I2C interface) allows complete read and write access from any master device. However, every master device that accesses an I2C device may not be equally trusted. In many cases, one or more I2C devices may be part of a system in which a master device has a layered code scheme. A layered code scheme is one in which different layers of code are associated with different levels of security and trust. As such, one layer may be trusted while other layers (e.g., device drivers) are user modifiable and may be less trusted. For example, a user modifiable layer of code may be a device driver. Embodiments of the systems and methods detailed herein related to controlling access and protection of I2C interfaces. Specifically, a control block which is developed and modified by the trusted code facilitates defining access and protection for each I2C device of the system by each code layer of the master device of the system. As discussed herein, a master device is a device (e.g., ASIC) that includes multiple layers of code that each have access, in accordance with the control block, to I2C devices. However, from the perspective of a given I2C device, each layer of code appears as a master. In addition, while one master device is discussed for explanatory purposes, any number of master devices as regarded herein (i.e., devices that each include multiple layers of code that wish to access I2C devices) may incorporate a corresponding control block, according to embodiments below, per master device.

Figure 1:
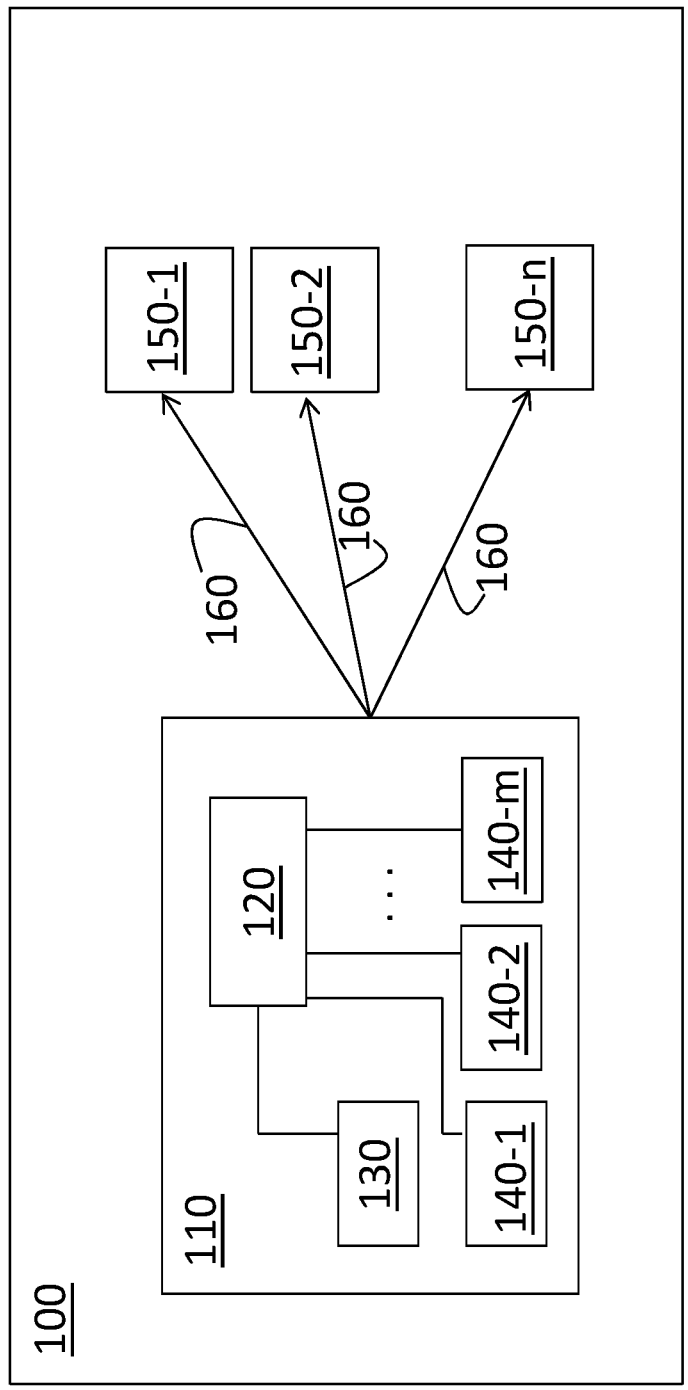
FIG. 1 is a logical block diagram of a system with a control block that controls output to I2C devices from a master device with different levels of code in accordance with an embodiment.

FIG. 1 is a logical block diagram of a system 100 with a control block 120 that controls commands to I2C devices 150 from a master device 110 with different levels of code 130, 140 in accordance with an embodiment. Examples below refer to three layers of code—M1, M2, and M3—associated with the trusted code 130 and two less trusted layers of code 140. Additional layers of code may be present according to the embodiments described herein. Exemplary I2C devices 150 may be memory devices or processing devices that can be written into and read out of from the master device 110. The system 100 shown in FIG. 1 includes I2C devices 150 acting as slave devices and a master device 110 with a layered code scheme. Thus, the master device 110 includes trusted code 130, usually as the lowest layer, and multiple modules of less trusted code 140 (e.g., device drivers) as other layers, as shown in FIG. 1. Each of the I2C devices 150 is accessible over an I2C interface 160. While the I2C interface 160 does not include any limits on access to the corresponding I2C device 150, the control block 120, developed by and modifiable only by the trusted code 130, limits interaction with the I2C devices 150 based on the level of code 130, 140 of the master device 110 seeking the access to an I2C device 150. The master device 110 may be implemented as an application specific integrated circuit (ASIC) and the control block 120 may be stored in an EEPROM, for example. The control block 120 specifies access via defined address spaces for the I2C devices 150 and specifies access restrictions to each I2C device 150 based on defining the address space assignment for each I2C device 150. The control block 120 includes data structures, further detailed below, that are loaded as a boot image. Thus, the data structures of the control block 120 may be modified and the boot image may be reloaded to change access restrictions.

Figure 2:
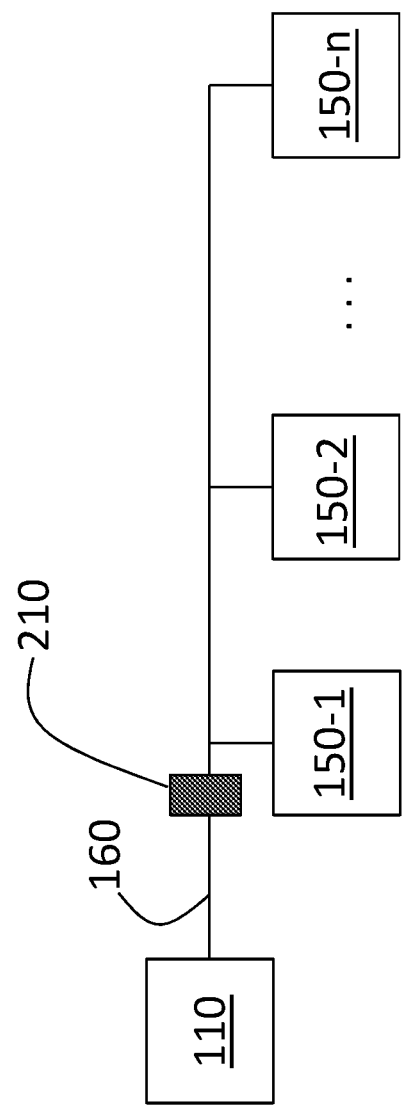
FIG. 2 illustrates a set of I2C devices chained together and accessible via a single port according to embodiments.

FIG. 2 illustrates a set of I2C devices 150 chained together and accessible via a single port 210 according to embodiments. In prior systems, accessing one of the I2C devices 150-1 through 150-n, shown in FIG. 2, involves a two-step process. This is because the device address corresponding to the desired I2C device 150 within the chain must be obtained as a separate step from sending a command to the device address corresponding to the desired I2C device 150 (once the device address is obtained). The address space assignment in the control block 120 of the master device 110 facilitates addressing the desired I2C device 150 based on its assigned address range assignment such that both the address range corresponding to the desired I2C device 150 and the command for that I2C device 150 may be included in a single command. Thus, one aspect of the role of the control block 120 is as an address translator for the I2C interface 160. Beyond this function, the control block also restricts access based on the address ranges of the I2C devices 150. That is, for example, while the trusted code 130 may be permitted to read out of and write into every address range (every aspect of every I2C device 150), less trusted code 140 of the master device 110 may be permitted only limited access, as further detailed below.

Access restriction is defined in the control block 120 using one data structure (device protection block 300 (FIG. 3)) that is required for each I2C device 150 and two other data structures (basic address protection block 500 (FIG. 5) and advanced address protection block 700 (FIG. 7)) that are optional. Each of these is further detailed below.

Figure 3:
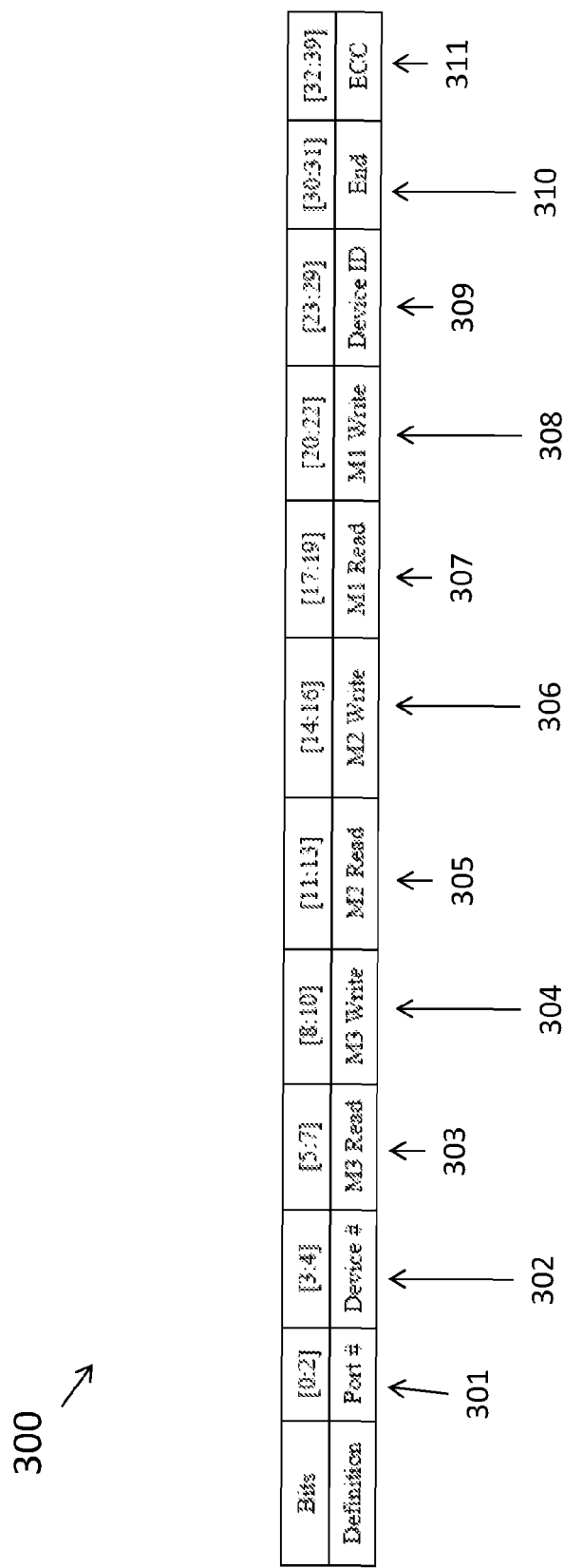
FIG. 3 shows the structure of an exemplary device protection block according to an embodiment.

FIG. 3 shows the structure of an exemplary device protection block 300 according to an embodiment. The example specifically covers three layers of code 130, 140. However, the example is not intended to limit the master device 110 to any particular number of layers of code 130, 140, and any number of layers of code 130, 140 may be considered according to the embodiments. As noted above, the device protection block 300 is developed or modified using the trusted code 130 and is stored in the control block 120. Also, a device protection block 300 is defined in association with each I2C device 150. As indicated in FIG. 3, bits 0 to 2 define the port number 301. The port number 301 is a binary value specifying which port is defined by the device protection block 300. For example, "000" may be used to specify port #0 while "001" may be used to specify port #1. The device number 302, defined by bits 3 to 4 is also a binary value and specifies which I2C device 150 on the port the device protection block 300 corresponds with. As noted above, more than one I2C device 150 may share the same port. Thus, for the same port number 301, there may be more than one device protection block 300, each specifying one of the I2C devices 150 that shares the port number 301. As also noted above, the assignment of an address range (see device id 309 below) to each I2C device 150 that shares the same port number 301 via the device number 302 facilitates a one-step process to send a command to a particular I2C device 150 in a chain of I2C devices 150 sharing a port number 301.

M3 Read 303 and M3 Write 304 define the allowable read access protections and write access protections, respectively, when M3 logic (M3 code layer which may be the trusted layer 130 or a less trusted layer 140) is attempting to respectively read or write to the I2C device 150 specified by the device number 302. M2 Read 305 and M2 Write 306 define the allowable read access protections and write access protections, respectively, when M2 logic (M2 code layer which may be the trusted layer 130 or a less trusted layer 140) is attempting to respectively read or write to the I2C device 150 specified by the device number 302. M1 Read 307 and M1 Write 308 define the allowable read access protections and write access protections, respectively, when M1 logic (M1 layer which may be the trusted layer 130 or a less trusted layer 140) is attempting to respectively read or write to the I2C device 150 specified by the device number 302. An exemplary M1 Read 307 definition is shown in FIG. 4. The device id 309 field defines the 7 bits (bits 23 through 29) used on the I2C interface 160. According to the example, for device id 309 #1, #2, or #3, the 7 bit device id 309 used on the I2C interface 160 to select the I2C device 150 is defined, but for device id 309 #0, the device id 309 is programmed with boot code. With regard to the end 310 field (defined by bits 30 and 31), "11" specifies that the current device protection block 300 is the last device protection block 300 defined. The next byte (in the EEPROM, for example) is then assumed to correspond with a basic address protection block 500. If bits 30 and 31, corresponding to the end 310 field, are not "11," then the current device protection block 300 is not the last device protection block 300 and the next device protection block 300 starts on the next byte address (in the EEPROM, for example). The error correction code (ECC) 311 field (bits 32 through 39) specifies ECC protection on bits 0 through 31.

Figure 7:
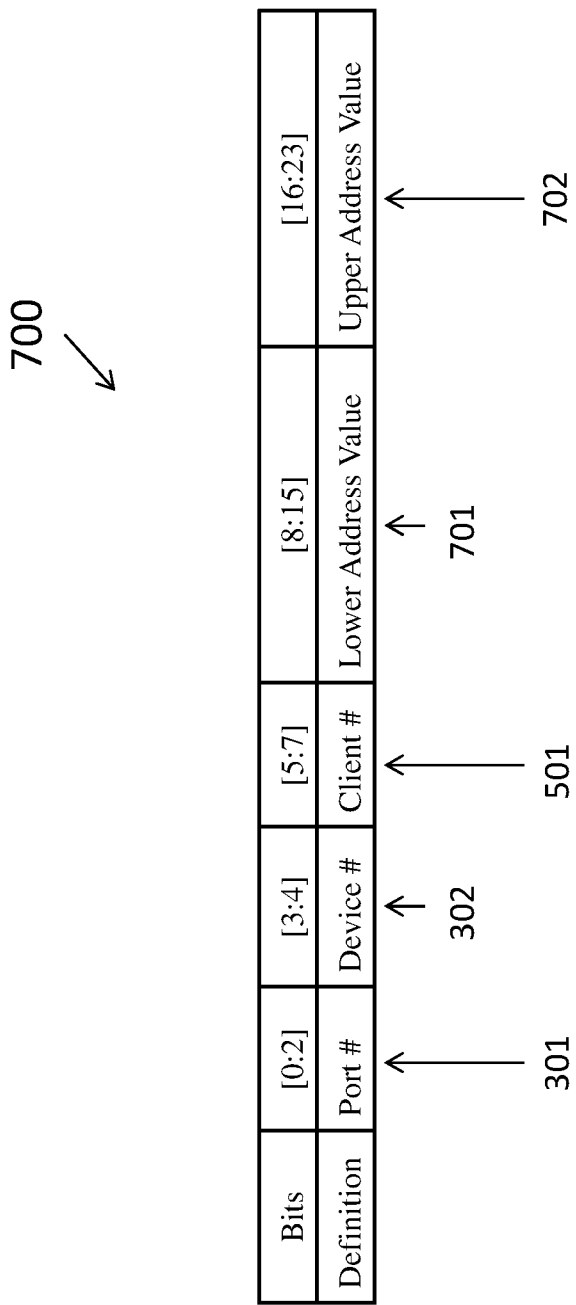
FIG. 7 shows the structure of an exemplary advanced address protection block according to an embodiment.

FIG. 4 is an example of optional definitions for a read 307 field of a level of code 130, 140 according to an embodiment. As FIG. 4 indicates, a read may not be allowed, may be allowed based on the mode (e.g., debug or lab mode), may be allowed without restriction, or may be allowed based on the basic address protection block 500 (FIG. 5) or advanced address protection block 700 (FIG. 7). That is, the device protection block 300 is required for each I2C device 150, but the optional basic address protection block 500 and advanced address protection block 700 may or may not be used for a given I2C device 150. As further discussed below, the device protection block 300 specifies blanket protections while the basic address protection block 500 and advanced address protection block 700 facilitate further granularity in the protections.

Figure 5:
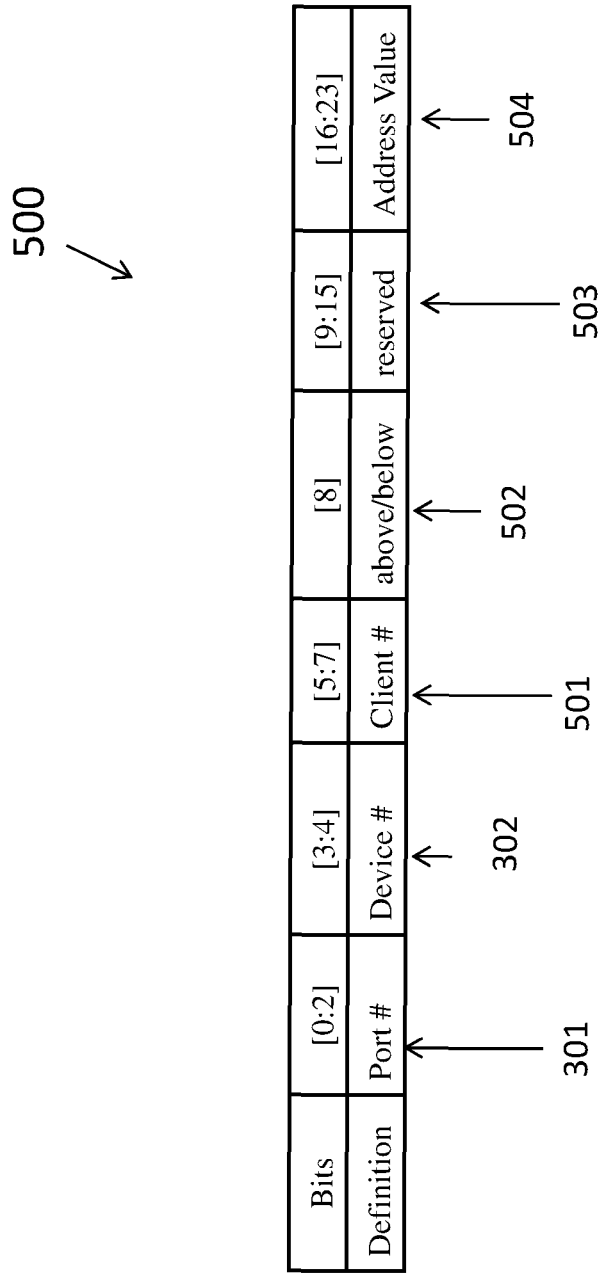
FIG. 5 shows the structure of an exemplary basic address protection block according to an embodiment.
Figure 6:
FIG. 6 shows an exemplary set of client number field values according to an embodiment.

FIG. 5 shows the structure of an exemplary basic address protection block 500 according to an embodiment. A given I2C device 150 may have more than one associated basic address protection block 500. Thus, while the port number 301 and device number 302 are the same in the basic address protection block 500 as they are in the device protection block 300, described above, the port number 301 and device number 302 additionally signal the end of the basic address protection blocks 500 for a given I2C device 150. Thus, the last of the basic address protection blocks 500 associated with an I2C device 150 has "111" in the port number 301 field and "11" in the device number 302 field. The client number 501 field specifies which code layer (e.g., trusted layer 130 or one of the less trusted layers 140) the basic address protection block 500 pertains to. This is because, as noted above, unlike the device protection block 300, the basic address protection block 500 facilitates finer granularity in setting access restrictions. FIG. 6 shows an exemplary set of options for the client number 501 field. The above/below 502 field specifies access for the code layer indicated by the client number 501 field. For example, when the above/below 502 field is set to "0," access will be allowed at or below the address specified by the Address Value 504 field. When the above/below 502 bit is set to "1," access will be allowed at or above the address specified by the Address Value 504 field. Thus, the address indicated in the Address Value 504 field is the address boundary (within the local address space of the given I2C device 150 to which the basic address protection block 500 pertains) of the allowed address region. The reserved 503 field is an optional, unused field in the basic address protection block 500. The reserved 503 field, if used, may be used to force the length of the basic address protection block 500 to be on byte boundaries for convenience. The reserved 503 field also serves to clarify that the addition of fields to the basic address protection block 500 (or other blocks discussed herein) is within variations and modifications contemplated by the embodiments.

FIG. 6 shows an exemplary set of client number 501 field values according to an embodiment. As FIG. 6 suggests, access above or below an address (based on the above/below 502 field and Address Value 504 field) may be granted for read and write operations with each of the code layers separately. One basic address protection block 500 may be defined to provide read access to the M1 code layer (client number 501 is "000") at or above a first address within the given I2C device 150 based on the above/below 502 field being "1" and the Address Value 504 field indicating the first address. Another basic address protection block 500 may be defined to provide write access to the M1 code layer (client number 501 is "001") at or below a second address based on the above/below 502 field being "0" and the Address Value 504 field indicating the second address. The reserved bits shown in FIG. 6 may be used for additional code layers or may not be used at all.

FIG. 7 shows the structure of an exemplary advanced address protection block 700 according to an embodiment. As noted for the basic address protection block 700 above, a given I2C device 150 may have more than one associated advanced address protection block 700. Again, the port number 301 and device number 302 are the same in the advanced address protection block 500 as they are in the device protection block 300, described above, but, additionally, the port number 301 and device number 302 may signal the end of the advanced address protection blocks 500 for a given I2C device 150. Unlike the basic address protection block 500, the end signal provided by the advanced address protection block 700 signals the end of all blocks (300, 500, 700) for a given I2C 150. Thus, at least one advanced address protection block 700 is required for each I2C device, if only to signal the end. In this case, only the port number 301 field (with a value "111") and the device number 302 field (with a value "11") are filled. The remaining fields of the advanced address protection block 700 are unused. When one or more advanced address protection blocks 700 are needed, the last of those includes "111" in the port number 301 field and "11" in the device number 302 field. FIG. 4, showing optional definitions for the M1 read 307 field, indicates that a values of "100", "101", "110", or "111" in one of the read or write fields (303, 304, 305, 306, 307, 308) requires a corresponding advanced address protection block 700. When more than one advanced address protection block 700 is associated with the same field (303, 304, 305, 306, 307, 308) entry, the advanced address protection blocks 700 are combined by a logical "OR." For a code layer specified by the client number 501, the advanced address protection block 700 specifies a window, bracketed by the Lower Address Value 701 and Upper Address Value 702 rather than an above or below indication (field 502) relating to a single Address Value 504, as discussed with reference to the basic address protection block 500. The Lower Address Value 701 and Upper Address Value 702 define a window within the corresponding I2C device 150 internal memory map in which access is permitted for the code layer (defined by client number 501).

Figure 8:
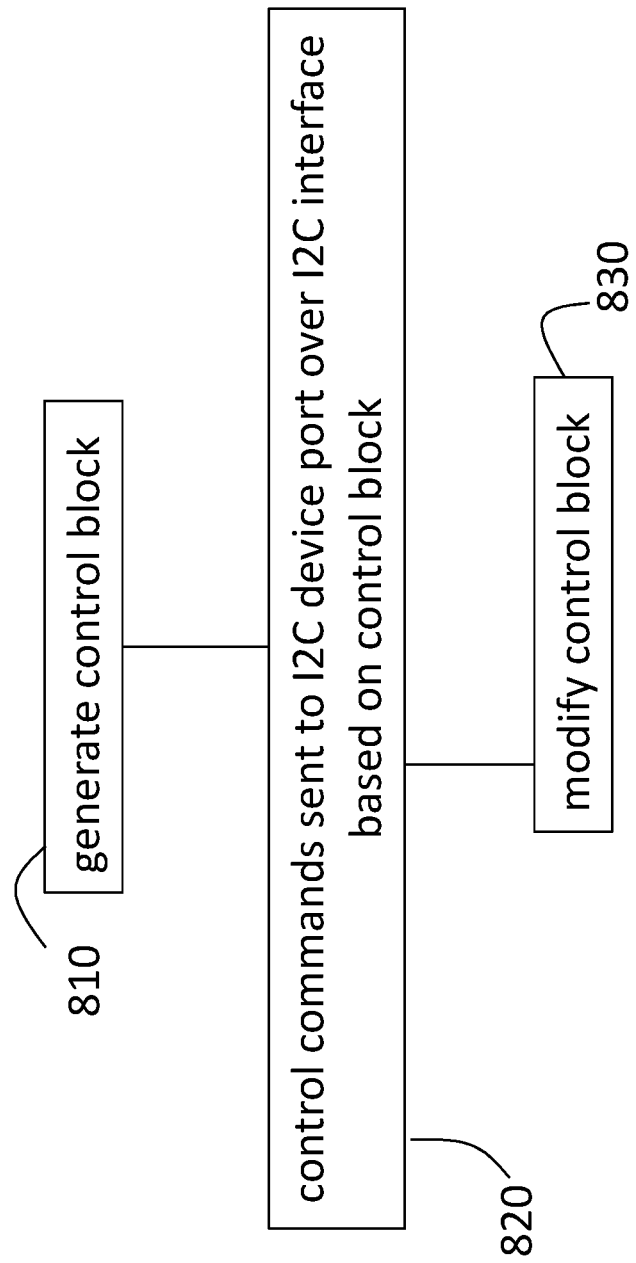
FIG. 8 is a process flow of a method of controlling access to I2C devices in a system that includes a layered code scheme for the master device according to embodiments.

FIG. 8 is a process flow of a method of controlling access to I2C devices 150 in a system 100 that includes a layered code scheme for the master device 110 according to embodiments. At block 810, generating a control block 120 includes only the trusted code 130 having access to generate the control block 120. The generating includes the ASIC or other implementation of the master device 110 using processors and memory devices and, optionally, user input, to define the data structures (e.g., device protection block 300) discussed above. The data structures of the control block 120, which is stored within the master device 110, define access permissions for the code layers (e.g., trusted code 130, less trusted code 140) of the layered code scheme of the master device 110. The control block 120 may be stored in a EEPROM, which is loaded at assembly and includes a boot image for the master device 110. Controlling commands sent to the I2C device 150 port 210 over the I2C interface 160 based on the control block 120, at block 820, includes applying the permissions defined in the control block 120 to any commands generated for the I2C device 150. Modifying the control block 120, at block 830, is optional and, like the generating, can only be performed by the trusted code 130 among the layered code. A modified control block 120 requires a reboot of the master device 110, because the data structures of the control block 120 are loaded as part of the boot image.

Technical effects and benefits include controlling access from a multi-layer master device 110 without modifying the I2C interface 160 to existing I2C devices 150.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for implementing access control to a slave device over an inter-integrated circuit (I2C) interface from a master device including a trusted code layer and a user-modifiable code layer, the computer program product comprising:

a computer readable storage medium having program instructions embodied therewith, the program instructions readable by a processing circuit to cause the processing circuit to perform a method comprising:

generating a control block defining the access control to the slave device over the I2C interface, the generating the control block being performed by the trusted code layer, the generating the control block being prohibited by the user-modifiable code layer, and the generating the control block including defining a plurality of data structures; and controlling a command over the I2C interface to the slave device based on a generated command from the trusted code layer and the user-modifiable code layer in accordance with the control block, wherein the defining the plurality of data structures includes defining a device protection data structure that defines a read permission and a write permission associated with the slave device for each of the trusted code layer and the user-modifiable code layer, and the defining the plurality of data structures includes defining two or more advanced address protection data structures, each of the two or more advanced address protection data structures is specific to the trusted code layer or the user-modifiable code layer and to a read operation or a write operation and defines a window of address values, corresponding to addresses in an internal memory map of the slave device, within which the read operation or the write operation is permitted, and the defining the plurality of data structures includes combining the two or more advanced address protection data structures using a logical OR.

* * * * *